United States Patent [19]
Fujinawa

[11] Patent Number: 5,897,233
[45] Date of Patent: Apr. 27, 1999

[54] IMAGE READING APPARATUS

[75] Inventor: Nobuhiro Fujinawa, Yokohama, Japan

[73] Assignee: Nikon Corporation, Tokyo, Japan

[21] Appl. No.: 08/888,514

[22] Filed: Jul. 7, 1997

[30] Foreign Application Priority Data

Jul. 9, 1996 [JP] Japan .................................. 8-179046
Jun. 24, 1997 [JP] Japan .................................. 9-166799

[51] Int. Cl.⁶ .................................................. G03B 17/24
[52] U.S. Cl. ........................ 396/418; 396/538; 242/358.1
[58] Field of Search ......................... 242/358.1; 396/538, 396/387, 411, 415, 418

[56] References Cited

U.S. PATENT DOCUMENTS 1,591,072  7/1926  Ziegler ...................................... 396/538
3,372,884  3/1968  Nagano ................................. 242/358.1

FOREIGN PATENT DOCUMENTS 5-75922  3/1993  Japan .
7-219029  8/1995  Japan .

Primary Examiner—David M. Gray
Attorney, Agent, or Firm—Oliff & Berridge, PLC

[57] ABSTRACT

A film feeding apparatus includes a driving roller, a take-up spool and a rotatable member on which the take-up spool is mounted. The driving roller feeds a film through the apparatus by contacting the film and is driven at a predetermined speed. The take-up spool receives the film moved through the apparatus by the driving roller, and is located adjacent to the driving roller so that when the film is fed between the driving roller and the take-up spool, the film is pinched between the driving roller and the take-up spool. The take-up spool is rotatably mounted to the rotatable member so as to be rotatable about a rotation center of the take-up spool. The rotatable member is rotatably mounted to the apparatus at a location other than the rotation center of the take-up spool.

21 Claims, 6 Drawing Sheets

IMAGE READING APPARATUS

BACKGROUND OF THE INVENTION

1. Field of the Invention

The present invention relates to film image reading apparatus.

2. Description of Related Art

Film scanners are apparatus that read (i.e., image or scan) film images from film photographed by conventional cameras. Film scanners read the images from negative-type film and from reversal-type film in order to acquire an electronic version of the images, which can then be input, e.g., to a personal computer, and the like. One inexpensive, general configuration provides an optical system that is fixed and a conveyor device that conveys the film past the optical system.

One example of a film that can be used in a film scanner is disclosed in Japanese Laid-Open Patent Application No. 5-75922. As shown in FIG. 4, this film 55 includes a magnetic recording layer.

The film 55 can be housed inside a film cartridge 51, having one end fixed to a spool 52. Perforations 53 and a magnetic recording section 54 are provided on the film 55, one per photographic frame. A frame number 0 (not illustrated), which is an area on which an image is not photographed, precedes the first photographic frame on the film 55. A perforation and a magnetic recording section are also provided for frame number 0.

Film cartridge 51 also includes an optically readable label that displays information indicating, for example, whether or not film 55 is developed and information indicating the type of film 55. The information indicating the type of film includes, for example, information indicating whether the film is negative or positive, information indicating whether the film is black-and-white or color, and information indicating the manufacturer's name and the type (i.e., model) number of the film. The optically readable label can be, e.g., a bar code.

One example of a feeding device for film housed in a cartridge is disclosed in Japanese Laid-Open Patent Application No. 7-219029. In this device, the film is sandwiched by a pinch roller and capstan roller, which are located between the position of a fork and the position of a take-up spool. The fork delivers the film from the cartridge by engaging with the film take-up shaft of the cartridge and rotating the take-up shaft. The take-up spool takes-up the film delivered from the cartridge and is located on the opposite side of the reading position relative to the fork. Driving of the spool, the rollers and the fork is controlled in a delayed fashion so as to maintain a relationship therebetween. First the driving of the take-up spool is controlled, then the capstan roller, and then the delivery fork. A clutch also is positioned on the take-up spool so as to absorb any difference of velocity with the capstan roller.

In these devices, the precision of the feeding of the film at the reading position is determined by controlling the rotation speed of the pinch roller and the capstan roller. The rotation speed of the pinch roller and the capstan roller depends on the speed at which the film is taken-up by the take-up spool. However, the rotational velocity of the effective outer perimeter of the take-up spool (i.e., the circumference of the take-up spool and surrounding film) becomes faster as the amount of film taken-up increases. In order to absorb this change of velocity, velocity control and a clutch mechanism as mentioned above were necessary, and the totality of the take-up section became complex and high-priced.

SUMMARY OF THE INVENTION

Embodiments of the present invention aim to provide an image reading device whereby driving of the film at a constant velocity is enabled by a comparatively inexpensive and simple configuration.

In order to achieve the above and other objects, and to address the shortcomings in the prior art, embodiments of the invention provide a film feeding apparatus having a driving roller, a take-up spool and a rotatable member on which the take-up spool is mounted. The driving roller feeds a film through the apparatus by contacting the film and is driven at a predetermined speed. The take-up spool receives the film moved through the apparatus by the driving roller, and is located adjacent to the driving roller so that when the film is fed between the driving roller and the take-up spool, the film is pinched between the driving roller and the take-up spool. The take-up spool is rotatably mounted to the rotatable member so as to be rotatable about a rotation center of the take-up spool. The rotatable member is rotatably mounted to the apparatus at a location other than the rotation center of the take-up spool.

Additionally, at least one spring, for example, can be attached to the rotatable member so that the take-up spool is forced toward the driving roller by rotation of the rotatable member.

Additionally, a film biasing device can be provided to force the film toward the take-up spool. The film biasing device can include a pressing member that presses the film toward the take-up spool and a guide member that guides the pressing member. The pressing member can include at least one roller that is biased against the take-up spool. The guide member can include at least one slot in the rotatable member, the at least one roller being guided by the at least one slot. The film biasing device can include a plate spring attached to the rotatable member.

The film biasing device can include at least one roller that contacts the film. The at least one roller can have a variable diameter, with the diameter being smaller at a central portion of the at least one roller than at ends of the at least one roller.

The film biasing device can include a guide member that guides the film toward the take-up spool as the film is received onto the take-up spool.

The apparatus can include a guide member that guides the film toward the take-up spool as the film is received onto the take-up spool.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
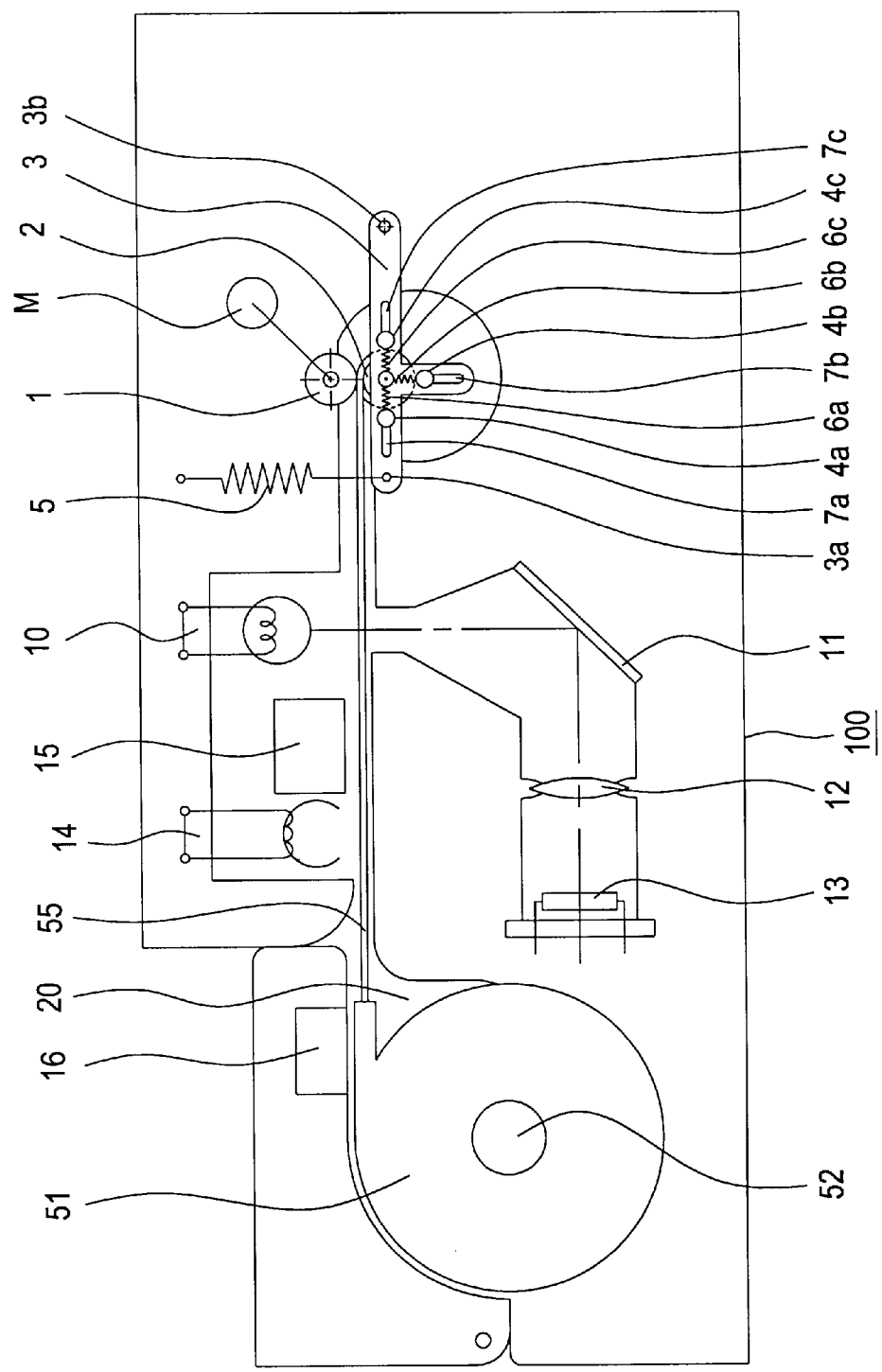
FIG. 1 is a side view showing an image reading device according to one embodiment of the present invention at the start of taking-up film from a cartridge.

A first embodiment of the present invention is explained with reference to FIGS. 1–4. The configuration of the film scanner 100 of the first embodiment is explained referring to FIGS. 1 and 2.

Cartridge loading chamber 20 is capable of having a cartridge 51 loaded therein. A drive member, i.e., a so-called fork (not illustrated), for driving spool 52 is provided in the cartridge loading chamber 20. By rotationally driving spool 52, film 55 is delivered out from cartridge 51. The film delivered out of the cartridge 51 is led toward a take-up section from a reading section following a guide.

A film information reading device 16 is provided in cartridge loading chamber 20 and reads information indicating the type of film, for example, from the film cartridge. The film information reading device 16 can be, e.g., a bar code reader. The information such as the type of film, read by device 16, is used for establishing scanning conditions, and the like, that do not differ depending on the particular photographic frames.

The film reading section includes a light source 10, a mirror 11, a projection optical system 12 and a CCD 13. The light source 10 is driven by a light source driving circuit (not illustrated) so that red, green, and blue light are emitted successively during operation of one round of reading. The light emitted from light source 10 is transmitted through one line on film 55, and it then reaches CCD 13 via projection optical system 12 so as to form an image of the film 55 on CCD 13. CCD 13 transforms the light from the image of the film 55, formed by projection optical system 12, into electric image signals. In the present embodiment, CCD 13 is a line sensor that reads one line of the original image during one round of reading.

Other image reading architectures and hardware could be used with the invention. For example, an arrangement could be provided in which the light is reflected from the film rather than being transmitted through the film. Photoelectric conversion devices other than a CCD also can be used with the invention. The photoelectric conversion device (i.e., the CCD or some other device) could be in the form of a matrix rather than a line.

A magnetic sensor 14 performs reading of information recorded in the magnetic recording sections 54 (see FIG. 4) and also can write information to the magnetic recording sections 54. The information read by magnetic sensor 14 is used for establishing the scanning conditions that are specific for each frame and for correcting the images.

An optical sensor 15 detects the perforations 53 (see FIG. 4) on the film. Optical sensor 15 includes an emitter and a receiver, and detects perforations 53 according to the presence or absence of reflection of emitted light from film 55. The detected perforations 53 are used for controlling the feeding of the film. For example, detection of the perforations can be used to find a specific frame by counting the number of detected perforations.

The take-up section will now be explained. A roller 1 is connected to a motor M via a motor transmission (not illustrated). Motor M rotates at a constant velocity.

Lever members 3 and 3' (only lever member 3 is illustrated in FIG. 1) are attached at the two ends of take-up spool 2 so that spool 2 rotates freely on the lever members 3 and 3'. One end 3b and 3b' (only 3b is illustrated) of lever members 3 and 3' is supported by a pin so as to be freely rotatable on the main body of the device. Holes 3a and 3a' (only 3a is illustrated) are provided in the vicinity of the other end of lever members 3 and 3'. Ends of springs 5 and 5' (only 5 is illustrated in FIG. 1), having opposite ends fixed to the main body are inserted in these holes, and provide clockwise drive force (or bias) to levers 3 and 3'. As a result, take-up spool 2 is pressed toward roller 1 by the drive force of springs 5 and 5'. Consequently, when film 55 is not located between roller 1 and take-up spool 2, although the take-up spool 2 is not directly provided with drive force, it rotates in the direction opposite to that of roller 1 due to its contact with the driven roller 1. When there is film 55 located between rollers 1 and 2, as shown in FIG. 1, roller 1 delivers out film 55, and take-up spool 2 rotates in the direction opposite to that of roller 1 following the movement of the film 55.

An arm protrudes from each lever member 3 and 3' and extends in a roughly perpendicular direction relative to the lengths of members 3 and 3'. Guide grooves 7a, 7b, 7c, 7a', 7b' and 7c' (only 7a, 7b and 7c are illustrated) are provided in lever members 3 and 3'. These grooves are provided in three places at roughly 90° intervals centered on the axial center of the take-up spool 2, and extend in directions away from the axial center of take-up spool 2. Guide grooves 7a, 7b and 7c guide rollers 4a, 4b and 4c, which are capable of moving along the guide grooves 7a, 7b and 7c.

Figure 3:
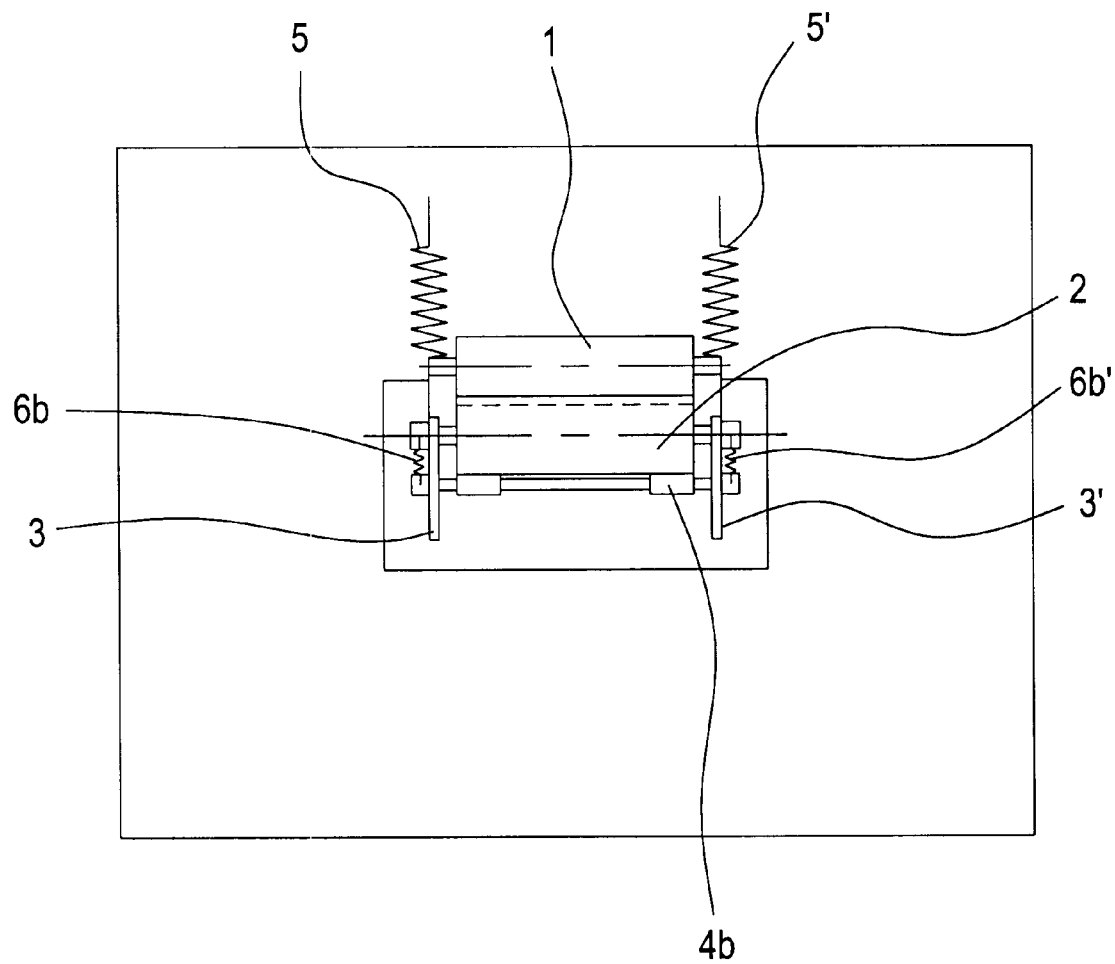
FIG. 3 is a front view in the vicinity of the take-up section of the FIG. 1 image reading device.
Figure 4:
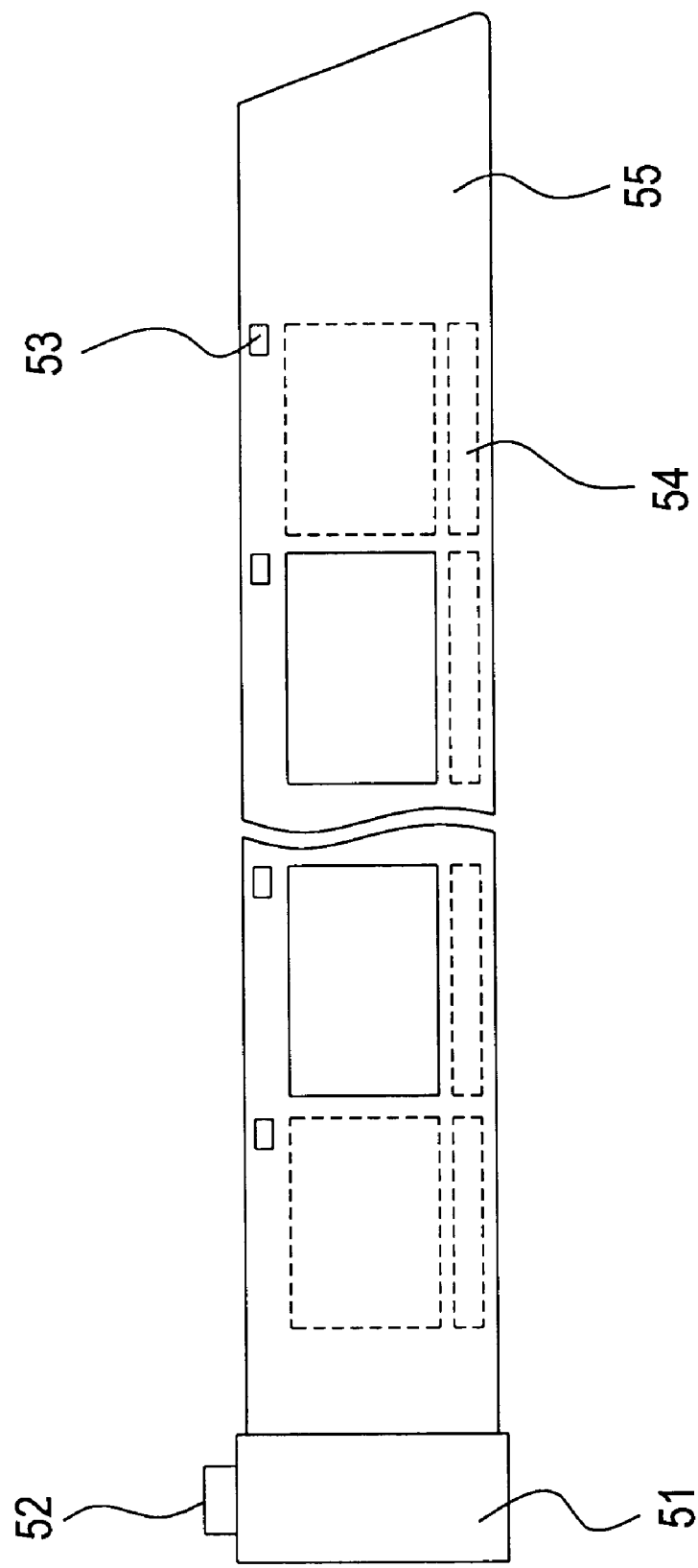
FIG. 4 shows a strip of film having magnetic recording sections, that is capable of being taken-up by an image reading device according to one embodiment of the present invention.

The two ends of guide rollers 4a, 4b and 4c are biased toward the axial center of take-up spool 2 by roller springs 6a, 6b, 6c, 6a', 6b' and 6c' (only springs 6a, 6b and 6c are illustrated in FIG. 1) attached to the ends of guide rollers 4a, 4b and 4c and attached in the vicinity of the axial center of take-up spool 2. Also, as shown in FIG. 3, each guide roller 4a–c has a diameter that varies from its ends to its centers, with the diameter of the center being smaller than the diameter of the ends.

In the present embodiment, three guide grooves and guide rollers are provided. However, any number of guide grooves and guide rollers is acceptable as long as the slack in the film 55 is eliminated by pressing the film 55 toward the axial center of the take-up spool 2. Due to the fact that the guide rollers 4a–c are supported to be capable of rotation, a smooth taking-up is possible while film 55 is pressed toward the direction of the axial center of take-up spool 2. When a low-friction member is used as guide rollers 4a–c, there is no need to make guide rollers 4a–c rotatable. By making the diameter of the center of the guide rollers 4a–c narrower than the diameter at the ends, the sliding resistance can be reduced because the contact surface area of film 55 is reduced. Consequently, a smooth taking-up becomes possible. By making the width of the center portion of rollers 4a–c (i.e., the portion having the narrower diameter) the same as, or slightly wider than, the width of the image-containing section of film 55, it is possible to prevent damage from occurring to the image-containing sections (i.e., the image frames) of the film 55 due to contact with the guide rollers 4a–c.

The operation of film scanner 100 is now explained. Spool 52 rotates when film cartridge 51 is loaded into the cartridge loading chamber 20. Thereupon, film 55 is delivered out from film cartridge 51 following a film guide. The film then reaches roller 1 of the take-up section after passing the reading section. Film 55 is wound around the take-up spool 2 due to the rotation of roller 1, the driving of the film due to rotation of the spool 52, and due to the tendency of the film to curl. When the leading end of film 55 reaches roller 1, film 55 becomes sandwiched by roller 1 and take-up spool 2. Roller 1 feeds film 55 quicker than the speed that the fork shaft feeds film 55. Therefore, after the leading end of film 55 has reached roller 1, film 55 is fed at the same linear velocity as the speed of rotation of the outer perimeter of roller 1.

As the end of the film is wound onto the take-up spool 2, by counting the perforations 53 of the film 55, the desired frame to be read is driven and taken-up to the reading position. Then, illuminating section 10 illuminates the end of the desired frame of film 55, the transmitted light that is transmitted through film 55 forms an image on the CCD 13 by way of the mirror 11 and the imaging lens 12, and one line of reading is performed. By performing reading while switching the illumination for reading of one line to red, green, and blue, reading of a full-color original becomes possible. When one line of reading is finished, film 55 is fed by a distance corresponding to one line by roller 1. By repeating this operation, one frame worth of reading is performed.

Figure 2:
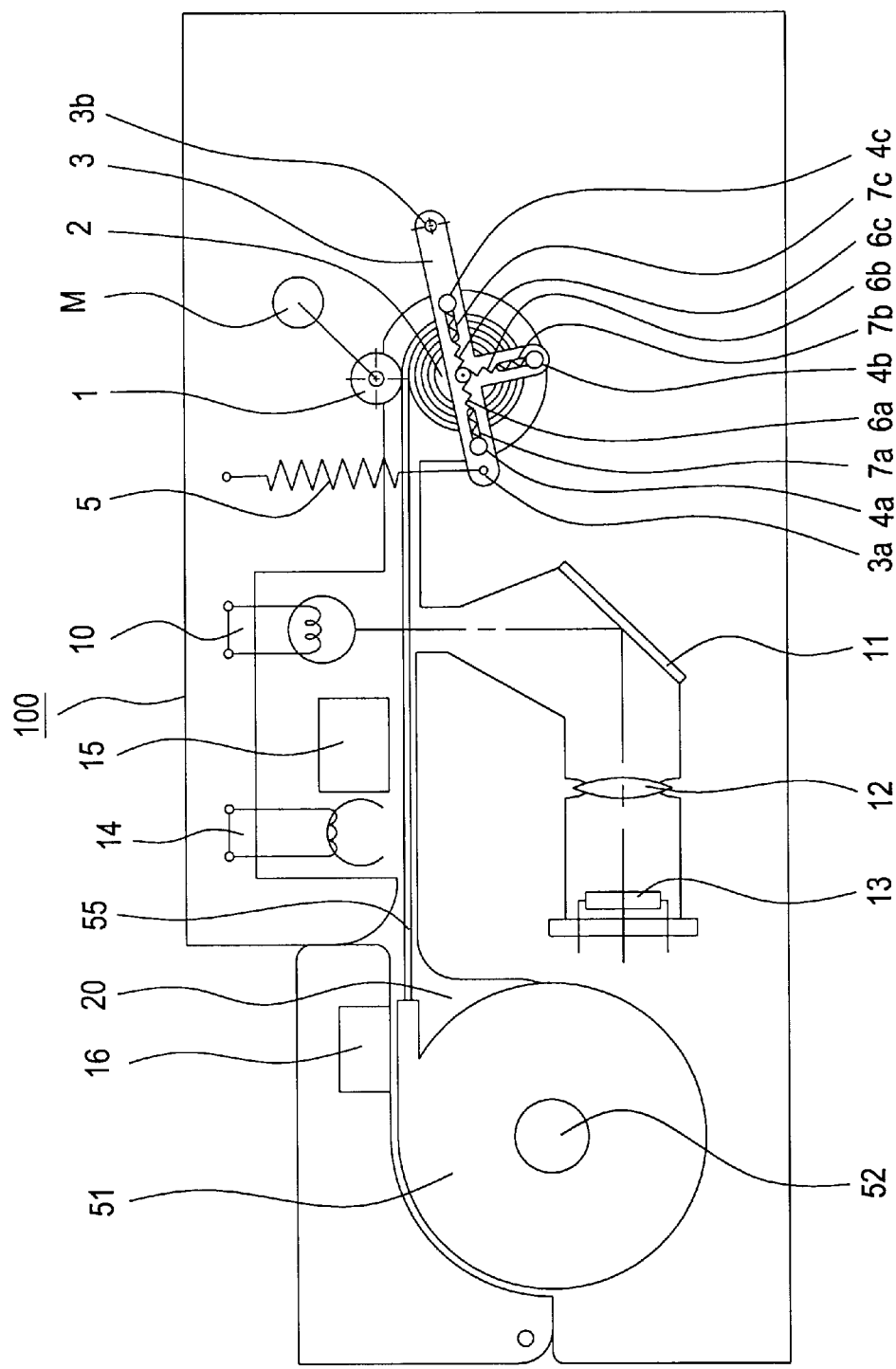
FIG. 2 is a side view showing the image reading device of FIG. 1 at the completion of taking-up film.

As shown in FIG. 2, when the diameter of film 55 taken up onto take-up spool 2 increases, lever members 3 and 3' rotate based on with the increase of the diameter of the taken-up film. This rotation is centered on the ends 3b and 3b'. Consequently, take-up spool 2 is distanced from roller 1 as a consequence to the taking-up of film 55. Because the velocity of the feeding of film 55 is determined only by roller 1, the rotational velocity of the film 55, wound onto take-up spool 2, in the position contacting roller 1 is constant. Because the diameter of film 55 taken-up onto take-up spool 2 becomes gradually larger, the rotational velocity of take-up spool 2 is reduced gradually according to the amount of film that has been wound. Guide rollers 4a, 4b and 4c move following guide grooves 7a–c in a direction away from the axial center of the take-up spool 2 according to the increase of the diameter of take-up spool 2 and the film 55 wound onto take-up spool 2. This keeps the film tightly wound on the take-up spool.

Consequently, feeding of film at the reading position is determined only by the rotational velocity of roller 1. Take-up spool 2 only follows roller 1. Therefore, it is possible to maintain a constant velocity of feeding at the point of contact of film 55 with roller 1, regardless as to the amount of film taken-up.

As detailed above, the velocity of feeding of the film can be made constant regardless of the size of the effective diameter of the take-up spool. Moreover, a conventional slip-clutch mechanism is unnecessary. Additionally, unlike previous devices, which required a spool shaft separate from a roller and a capstan, the present arrangement results in a more simplified mechanism, resulting in a reduction of cost and an increase of reliability. There is no need to provide a separate roller and capstan to determine the speed at which the film is being fed at the reading section.

Figure 5:
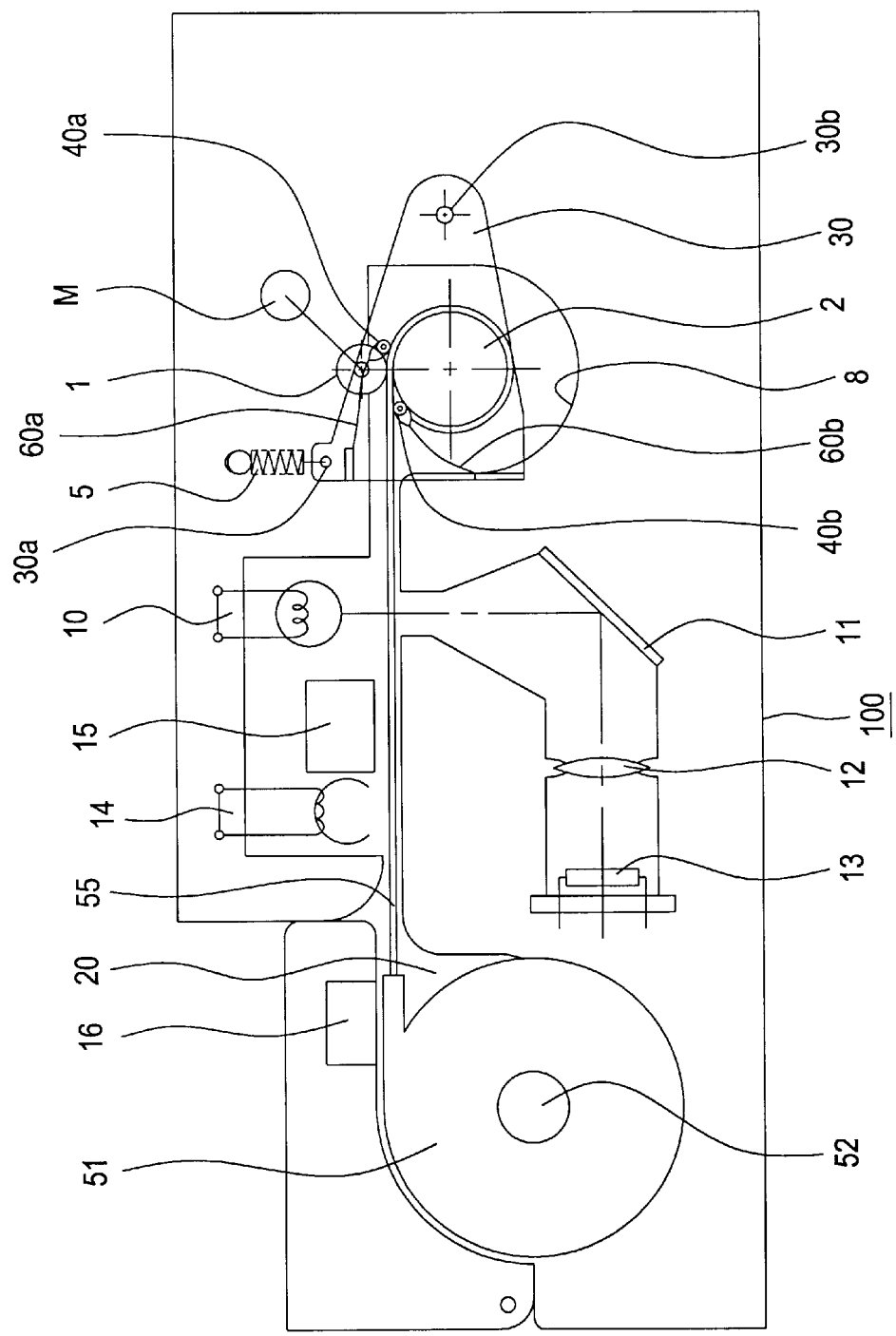
FIG. 5 is a side view showing an image reading device according to a second embodiment of the present invention at the start of taking-up film from a cartridge.
Figure 6:
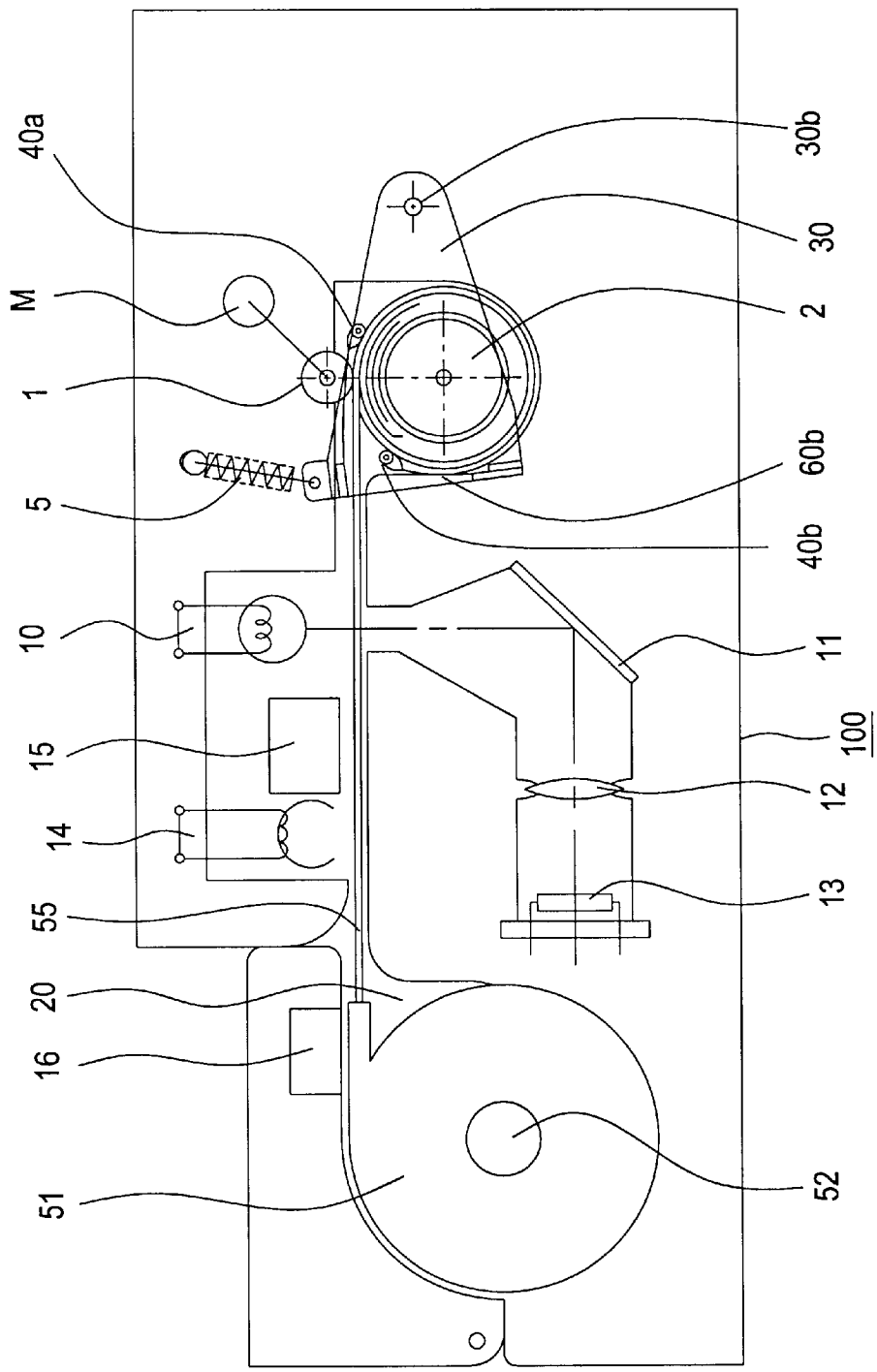
FIG. 6 is a side view of the FIG. 5 device at the completion of taking-up film.

Next, a film scanner according to a second embodiment of the present invention is explained referring to FIG. 5 and FIG. 6. FIG. 5 shows the condition of the device when film 55 is initially being taken-up onto spool 2. FIG. 6 shows the condition of the device when film 55 has been completely taken-up onto spool 2.

The second embodiment differs from the first embodiment with respect to the mechanism provided at the perimeter of the spool shaft. Otherwise, the configuration of the second embodiment is substantially identical to that of the first embodiment. Consequently, elements of the second embodiment that are the same as those of the first embodiment are identified with the same reference numerals, and their explanation is omitted for expedience.

Roller 1 is connected to motor M by way of a transmission, and rotates counterclockwise at a constant angular velocity during feeding of the film so as to feed the film 55 at a constant linear velocity.

Take-up spool 2 is positioned within spool chamber 8, and is a cylindrical member for taking-up film 55. Take-up spool 2 is supported so as to be capable of rotation on a lever member 30, to be described later. Because there is no drive mechanism connected to take-up spool 2, it rotates freely upon the application of externally-applied force.

Lever member 30 is a roughly triangular-shaped plate that supports the take-up spool 2. Lever member 30 includes a rotation shaft 30b fixed at one end. Rotation shaft 30b is supported by the housing of film scanner 100. Consequently, lever member 30 is capable of rotation in relation to the housing, having rotation shaft 30b as the center of rotation. One end of a spool spring 5 is fixed to the other end 30a of lever member 30. The opposite end of spool spring 5 is fixed to the housing of scanner 100. Spool spring 5 biases take-up spool 2 toward roller 1.

A first plate spring 60a and a second plate spring 60b are connected to lever member 30. A first small-gauge roller 40a is rotatably fixed on one end of the first plate spring 60a. A second small-gauge roller 40b is rotatably fixed on one end of the second plate spring 60b. The first plate spring forces the first small-gauge roller toward take-up spool 2. The second plate spring forces the second small-gauge roller toward take-up spool 2. By the above configuration, film 55 is forced toward take-up spool 2 by the first small-gauge roller and the second small-gauge roller. Consequently, a more assured film take-up is realized.

Although not shown, a lever 30' and a spool spring 5', having the same configuration as lever 30 and spool spring 5, are positioned on the opposite side of take-up spool 2.

Next, the operation of the film scanner of the second embodiment is explained. When film cartridge 51 is loaded into cartridge loading chamber 20, a fork shaft (not illustrated) engages with spool 52. Spool 52 rotates clockwise following the rotation of the fork shaft. Film 55 is fed from cartridge 51 toward take-up spool 2. Motor M initiates rotation of roller 1 concurrently with the initiation of rotation of the fork shaft, under the control of a controller (not illustrated). At this time, take-up spool 2 is caused to rotate clockwise by roller 1.

When the leading end of film 55 reaches roller 1, film 55 becomes sandwiched by roller 1 and take-up spool 2. Roller 1 feeds film 55 quicker than the speed that the fork shaft feeds film 55. Therefore, after the leading end of film 55 has reached roller 1, film 55 is fed at the same linear velocity as the speed of rotation of the outer perimeter of roller 1. Additionally, take-up spool 2 rotates by frictional force with film 55.

Next, the leading end of film 55 is directed toward the point of contact between take-up spool 2 and first small-gauge roller 40a, while being guided by the first plate spring and the first small-gauge roller 40a. Film 55 is pressed against take-up spool 2 by first small-gauge roller 40a.

Next, the leading end of film 55 comes off from take-up spool 2 upon passing first small-gauge roller 40a, and advances toward the inner wall of spool chamber 8. After the leading end of film 55 has contacted the inner wall of spool chamber 8, film 55 advances into spool chamber 8 while being guided by the inner wall. The film 55 then is directed toward the point of contact between take-up spool 2 and second small-gauge roller 40b. At this point, the film 55 is pressed against take-up spool 2 by second small-gauge roller 40b. The position at which second small-gauge roller 40b presses take-up spool 2 is slightly more upstream in the direction of rotation of take-up spool 2 than the position at which take-up spool 2 presses roller 1. Consequently, the leading end of film 55, having passed the second small-gauge roller 40b, becomes sandwiched between film 55 itself and take-up spool 2. Subsequently, the film 55 is taken up onto take-up spool 2.

An explanation of an image reading process is omitted because it is identical to that of the first embodiment.

When film 55 is successively taken-up onto take-up spool 2, it comes to a condition of rolling thickly as shown in FIG. 6. That is, the diameter totaling that of take-up spool 2 and film 55 becomes greater. Pursuant to the condition of rolling thickly, take-up spool 2 becomes distanced from roller 1, opposing the force of spool spring 5. As described above, the linear velocity of film 55 is maintained constant by the rotation of roller 1. Consequently, as the taking-up process advances, the angular velocity of spool 2 is reduced.

In the above-mentioned embodiments, take-up spool 2 was configured to rotate freely by providing a driving member for the film 55 other than the take-up spool 2. Consequently, there is no need to provide a slip mechanism such as in conventional devices and there is a reduction in the cost of the device.

Additionally, because a mechanism is provided for making roller 1, which feeds the film, and take-up spool 2 move toward and away from each other, it becomes possible to omit the pinch roller that is provided on conventional devices. Consequently, there is a further reduction in cost.

Additionally, when film 55 is taken up onto take-up spool 2, first plate spring 60a and second plate spring 60b guide film 55. Consequently, failure of take-up of film 55 onto take-up spool 2 is reduced.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. A film feeding apparatus comprising:
    a driving roller that feeds a film through the apparatus by contacting the film;
    a take-up spool that receives the film moved through the apparatus by the driving roller, the take-up spool being located adjacent to the driving roller so that when the film is fed between the driving roller and the take-up spool, the film is pinched between the driving roller and the take-up spool; and
    a rotatable member, the take-up spool being rotatably mounted to the rotatable member so as to be rotatable about a rotation center of the take-up spool, the rotatable member being rotatably mounted to the apparatus at a location other than the rotation center of the take-up spool.

2. The apparatus of claim 1, further comprising at least one spring attached to the rotatable member so that the take-up spool is forced toward the driving roller by rotation of the rotatable member.

3. The apparatus of claim 1, further comprising a film biasing device that forces the film toward the take-up spool.

4. The apparatus of claim 3, wherein the film biasing device includes a pressing member that presses the film toward the take-up spool and a guide member that guides the pressing member.

5. The apparatus of claim 4, wherein the pressing member is at least one roller that is biased against the take-up spool, and the guide member is at least one slot in the rotatable member, the at least one roller being guided by the at least one slot.

6. The apparatus of claim 3, wherein the film biasing device includes a plate spring attached to the rotatable member.

7. The apparatus of claim 3, wherein the film biasing device includes at least one roller that contacts the film.

8. The apparatus of claim 7, wherein a diameter of the roller at a central portion of the at least one roller is smaller than a diameter of the roller at ends of the at least one roller in an axis direction.

9. The apparatus of claim 1, further comprising a guide member that guides the film toward the take-up spool as the film is received onto the take-up spool.

10. The apparatus of claim 1, wherein the driving roller is rotated at a predetermined speed.

11. An image reading apparatus comprising:
    moving means for moving a film through the apparatus;
    a take-up spool that receives the film moved through the apparatus by the moving means;
    a rotatable member, the take-up spool being rotatably mounted to the rotatable member so as to be rotatable about a rotation center of the take-up spool, the rotatable member being rotatably mounted to the apparatus at a location other than the rotation center of the take-up spool;
    illumination means for illuminating the film; and
    image reading means for reading an image on the film that has been illuminated by the illuminating means.

12. An image reading apparatus comprising:
    a driving roller that feeds a film through the apparatus by contacting the film and being driven;
    a take-up spool that receives the film moved through the apparatus by the driving roller, the take-up spool being located adjacent to the driving roller so that when the film is fed between the driving roller and the take-up spool, the film is pinched between the driving roller and the take-up spool;
    a rotatable member, the take-up spool being rotatably mounted to the rotatable member so as to be rotatable about a rotation center of the take-up spool, the rotatable member being rotatably mounted to the apparatus at a location other than the rotation center of the take-up spool;
    a light source that illuminates the film; and
    a photoelectric conversion device that receives light from the light source that has illuminated the film and that outputs image signals based on the received light.

13. The apparatus of claim 12, further comprising at least one spring attached to the rotatable member so that the take-up spool is forced toward the driving roller by rotation of the rotatable member.

14. The apparatus of claim 12, further comprising a film biasing device that forces the film toward the take-up spool.

15. The apparatus of claim 14, wherein the film biasing device includes a pressing member that presses the film toward the take-up spool and a guide member that guides the pressing member.

16. The apparatus of claim 15, wherein the pressing member is at least one roller that is biased against the take-up spool, and the guide member is at least one slot in the rotatable member, the at least one roller being guided by the at least one slot.

17. The apparatus of claim 14, wherein the film biasing device includes a plate spring attached to the rotatable member.

18. The apparatus of claim 14, wherein the film biasing device includes at least one roller that contacts the film.

19. The apparatus of claim 18, wherein a diameter of the roller at a central portion of the at least one roller is smaller than a diameter of the roller at ends of the at least one roller in an axis direction.

20. The apparatus of claim 12, further comprising a guide member that guides the film toward the take-up spool as the film is received onto the take-up spool.

21. The apparatus of claim 12, wherein the driving roller is rotated at a predetermined speed.

* * * * *